United States Patent
Yamauchi et al.

(10) Patent No.: US 7,805,214 B2
(45) Date of Patent: Sep. 28, 2010

(54) GRASP STATE JUDGING SYSTEM AND METHOD

(75) Inventors: Yuhei Yamauchi, Tokyo (JP); Nobutaka Hida, Tokyo (JP); Akira Kuwano, Tama (JP); Mai Yoritaka, Tama (JP)

(73) Assignee: Benesse Corporation (JP)

( * ) Notice: Subject to any disclaimer, the term of this patent is extended or adjusted under 35 U.S.C. 154(b) by 593 days.

(21) Appl. No.: 11/575,971

(22) PCT Filed: Sep. 22, 2005

(86) PCT No.: PCT/JP2005/017532

§ 371 (c)(1), (2), (4) Date: Mar. 24, 2007

(87) PCT Pub. No.: WO2006/033415

PCT Pub. Date: Mar. 30, 2006

(65) Prior Publication Data

US 2007/0288104 A1  Dec. 13, 2007

(30) Foreign Application Priority Data

Sep. 24, 2004  (JP) ............................. 2004-278516

(51) Int. Cl.
  *G06F 19/00* (2006.01)
  *G05B 19/04* (2006.01)
  *G05B 15/00* (2006.01)
(52) U.S. Cl. ..................... 700/170; 340/10.1; 340/10.2; 340/10.31; 700/245; 700/246; 700/249; 700/258
(58) Field of Classification Search .......... 700/245–263
See application file for complete search history.

(56) References Cited

U.S. PATENT DOCUMENTS 4,687,979 A * 8/1987 Ashton et al. ............... 318/638

(Continued)

FOREIGN PATENT DOCUMENTS

JP 2000-330946 A 11/2000

(Continued)

OTHER PUBLICATIONS

Shigeru Uesugi, Yoshiyuki Minowa, "Sakuiteki Communication o Mezashita Tsumiki Interface", The Transaction of Human Interface Society, vol. 5, No. 1, Feb. 25, 2003, pp. 143-151.

*Primary Examiner*—Albert DeCady
*Assistant Examiner*—Sunray R Chang
(74) *Attorney, Agent, or Firm*—Lowe Hauptman Ham & Berner, LLP

(57) ABSTRACT

A grasp state judging system capable of satisfactorily judging the grasp state in which an object to be grasped is held by grasping means. The grasp state judging system is characterized in comprising a plurality of RFID tags that are mounted on an object to be grasped and that transmit the corresponding position ID; a plurality of RFID antennas (14) that are mounted on a glove (10) and that receive the position IDs; a grabbing pattern storage unit (48) for storing a condition for the position IDs received by the RFID antennas (14) with respect to the grasp states in which the object to be grasped is held by the glove (10); and a grasp state judging unit (44) for judging the grasp state in which the object to be grasped is held by the grasping means on the basis of the position IDs received by the RFID antennas (14) and the conditions stored in the grabbing pattern storage unit (48).

6 Claims, 5 Drawing Sheets

U.S. PATENT DOCUMENTS

| | | | |
|---|---|---|---|
| 4,870,868 A * | 10/1989 | Gastgeb et al. | 73/649 |
| 4,899,095 A * | 2/1990 | Kishi et al. | 700/262 |
| 5,471,405 A * | 11/1995 | Marsh | 702/41 |
| 6,079,269 A * | 6/2000 | Dilz, Jr. | 73/488 |
| 6,516,471 B1 * | 2/2003 | Baumann | 2/19 |
| 6,772,442 B2 * | 8/2004 | Erker | 2/161.2 |
| 7,242,293 B2 * | 7/2007 | Rea et al. | 340/539.11 |
| 7,255,238 B2 * | 8/2007 | Ikeya | 212/331 |
| 7,458,699 B2 * | 12/2008 | Whiteside et al. | 362/103 |
| 2002/0158751 A1 * | 10/2002 | Bormaster | 340/10.2 |

FOREIGN PATENT DOCUMENTS

| | | |
|---|---|---|
| JP | 2000-330946 A | 11/2000 |
| JP | 2002-116875 A | 4/2002 |
| JP | 2002-116875 A | 4/2002 |

\* cited by examiner

| ANTENNA ID | OBJECT ID / POSITION ID |
|---|---|
| 1 | 001/001    001/002 |
| 2 | 001/002 |
| 3 | 001/003 |
| 4 | 001/003 |
| 5 | NUL |
| 6 | NUL |

(b)

| VIBRATION | 1 |
|---|---|

(c)

| PRESSURE | x |
|---|---|

GRASP STATE JUDGING SYSTEM AND METHOD

TECHNICAL FIELD

The present invention relates to a grasp state judging system and method, and more particularly relates to a technique for judging the grasp state in which an object to be grasped held by grasping means.

BACKGROUND ART

Patent Document 1 below discloses a technique for judging the state in which a user's hand (grasping means) is holding a mobile telephone or other instrument body (object to be grasped) to set the function of the instrument thereby to an appropriate environment. In this technique, touch sensors are mounted on either side portion of the instrument body, and the state in which the instrument body is held, is judged based on the detection results.

[Patent Document 1] Japanese Laid-open Patent Application No. 2000-330946

DISCLOSURE OF THE INVENTION

Problems to be Solved by the Invention

However, problems have been encountered in the prior art in that the state in which an instrument is held cannot be judged in sufficient detail because the judgment is made solely on the basis of the location in which the instrument body comes into contact with the hand. For example, it is impossible to detect in the prior art whether the instrument body is held upside down.

The present invention was contrived in view of the above-mentioned problems, and an object thereof is to provide a grasp state judging system and method whereby the grasp state of how an object to be grasped is held by grasping means can be judged in a detailed fashion.

Means for Solving the Problem

In order to solve the above mentioned problems, the grasp state judging system according to the present invention is characterized in comprising a plurality of transmitting means mounted on one of an object to be grasped and grasping means, each transmitting position identification information; a plurality of receiving means mounted on the other of the object to be grasped and the grasping means, each receiving the position identification information; condition storage means for storing a condition for the position identification information received by the receiving means with respect to each of grasp states in which the object to be grasped is held by the grasping means; and judging means for judging the grasp state in which the object to be grasped is held by the grasping means on the basis of the position identification information received by the plurality of receiving means and the conditions stored in the condition storage means.

Furthermore, the grasp state judging method according to the present invention is characterized in comprising mounting, on one of an object to be grasped and a grasping means, a plurality of transmitting means each for transmitting position identification information; mounting, on the other of the object to be grasped and the grasping means, a plurality of receiving means each for receiving the position identification information; storing, in condition storage means, a condition for the position identification information received by the receiving means with respect to each of grasp states in which the object to be grasped is held by the grasping means; and judging the grasp state in which the object to be grasped is held by the grasping means on the basis of the position identification information received by the plurality of receiving means and the conditions stored in the condition storage means.

According to the present invention, a plurality of transmitting means are mounted on one of the object to be grasped and the grasping means, and a plurality of receiving means are mounted on the other. Position identification information is transmitted from the transmitting means to the receiving means. The position identification information is information for identifying the position in which the transmitting means is mounted. In the present invention, a condition is stored in advance for the position identification information received by the receiving means with respect to each grasp state. The grasp state in which the object to be grasped is held can be judged in a detailed fashion because the judgment is made based on the position identification information actually received by the plurality of receiving means and the conditions stored in the condition storage means. The object to be grasped is a target object that is grasped, and the grasping means is a hand as such, a glove, or the like.

According to an aspect of the present invention, a pressure sensor for detecting the magnitude or presence of pressure when the object to be grasped is held by the grasping means is mounted on one of the object to be grasped and the grasping means; and the judging means judges the grasp state in which the object to be grasped is held by the grasping means on the basis of the magnitude or presence of pressure detected by the pressure sensor. Thus, the manner in which the object to be grasped is held can be judged with consideration given to the magnitude or presence of pressure when the grabbing object is held by the grasping means.

According to another aspect of the present invention, a vibration sensor for detecting the magnitude or presence of vibrations when the object to be grasped is held by the grasping means is mounted on one of the object to be grasped and the grasping means, and the judging means judges the grasp state in which the object to be grasped is held by the grasping means on the basis of the magnitude or presence of vibrations detected by the vibration sensor. Thus, the grasp state in which the object to be grasped is held can be judged with consideration given to the magnitude or presence of vibrations when the object is held by the grasping means.

According to yet another aspect of the present invention, the transmitting means is RFID tag, and the receiving means is RFID antenna. The transmitting means can thereby be easily made more compact, and the power source can be dispensed with. Therefore, the object to be grasped does not require much processing or the like, particularly in cases in which the transmitting means are mounted on the object to be grasped.

BRIEF DESCRIPTION OF THE DRAWINGS

FIG. 5 is a diagram schematically showing data transmitted to a computer from the glove;

BEST MODE FOR CARRYING OUT THE INVENTION

An embodiment of the present invention is described in detail below with reference to the drawings.

Figure 1:
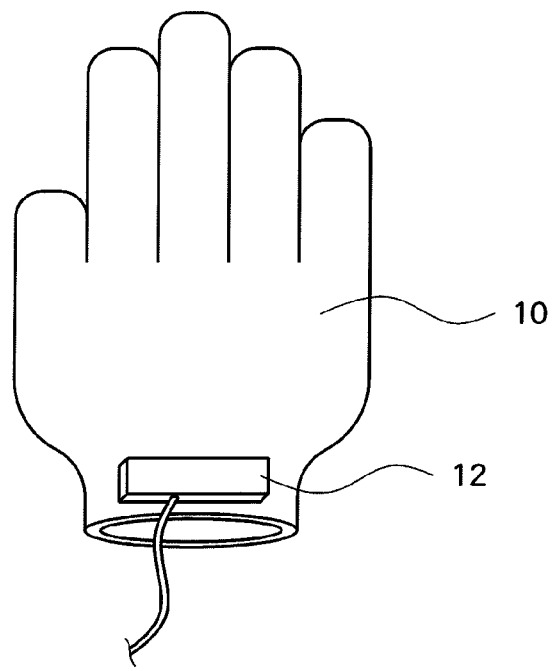
FIG. 1 is a front view of a glove used in a grasp state judging system according to an embodiment of the present invention.
Figure 2:
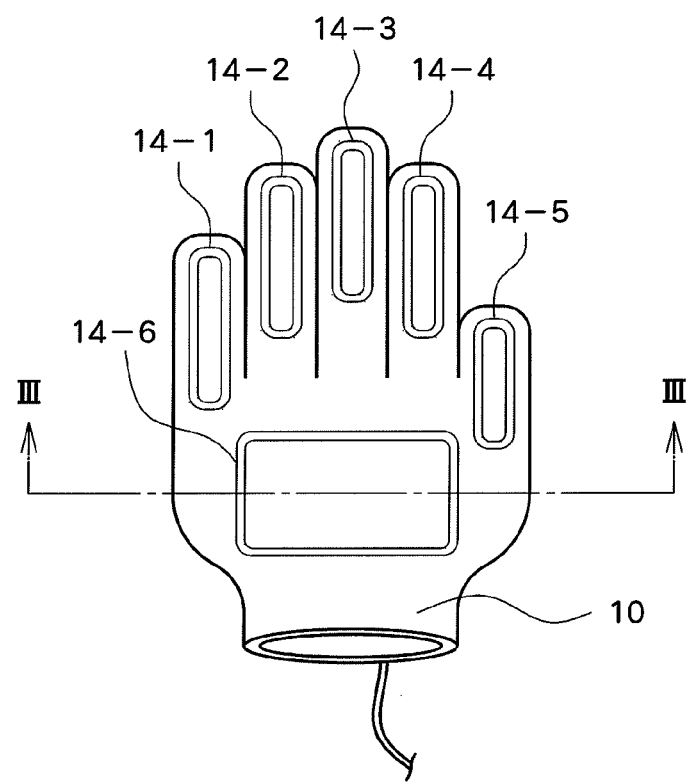
FIG. 2 is a rear view of the glove used in the grasp state judging system according to the embodiment of the present invention.
Figure 3:
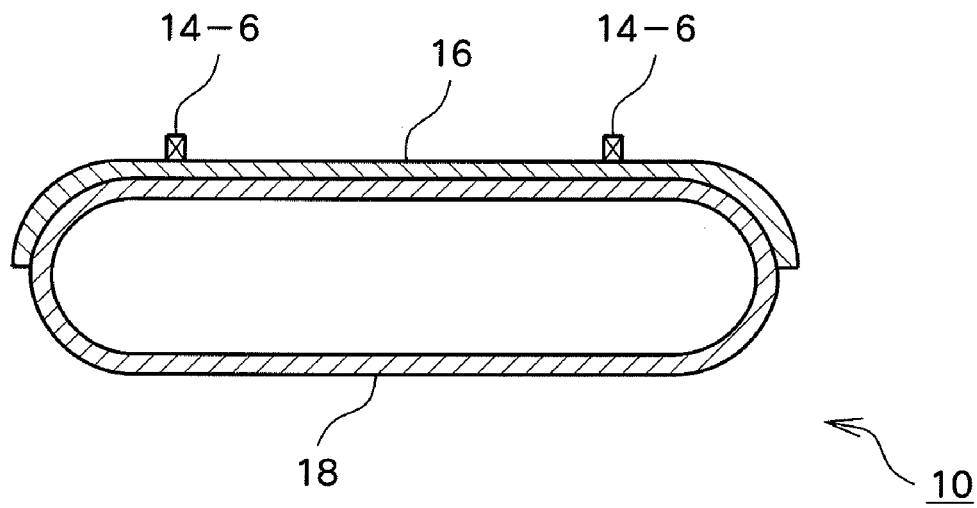
FIG. 3 is a cross-sectional view along III-III in FIG. 2.

FIG. 1 is a front view of a glove (grasping means) used in a grasp state judging system according to an embodiment of the present invention. FIG. 2 is a rear view of the glove. FIG. 3 is a cross-sectional view along III-III in FIG. 2. As shown in the drawings, the glove 10 used in the grasp state judging system has a sheet-shaped pressure sensor 16 affixed to the entire rear surface (to the palm when a hand is fitted into the glove 10) of a base material 18 that is formed into the shape of a glove from synthetic leather or another appropriate material. Furthermore, RFID (Radio Frequency Identification) antennas 14-1 to 14-6 are affixed on the top of the pressure sensor. The RFID antenna 14-1 is affixed on a portion that encircles the little finger; the RFID antenna 14-2 is affixed on a portion that encircles the ring finger; the RFID antenna 14-3 is affixed on a portion that encircles the middle finger; the RFID antenna 14-4 is affixed on a portion that encircles the index finger; the RFID antenna 14-5 is affixed on a portion that encircles the thumb; and the RFID antenna 14-6 is affixed on a portion covering the palm. A control box 12 is mounted on the wrist on the front surface of the glove 10 (on the back of the hand when the hand is fitted in the glove 10). Lines from the RFID antennas 14-1 to 14-6 run to the control box 12 and are connected to an internal control unit 12*a* (see FIG. 6). Lines from the pressure sensor 16 are also ran to the control box 12 and connected to the internal control unit 12*a*. Furthermore, a vibration sensor 12*b* (see FIG. 6) is mounted in the control box 12, and the vibration sensor 12*b* is connected to the control unit 12*a*. One end of a communication cable is connected to the control unit 12*a*, and the other end is connected to a computer (not shown) (the first computer 30, described below). Thus, data detected by the RFID antennas 14-1 to 14-6, the presence of vibrations detected by the vibration sensor 12*b*, and the value for the pressure detected by the pressure sensor 16 can be inputted to the computer as digital data. Various data is transmitted from the glove 10 to the computer by using wires, but the data may also be transmitted wirelessly.

Figure 4:
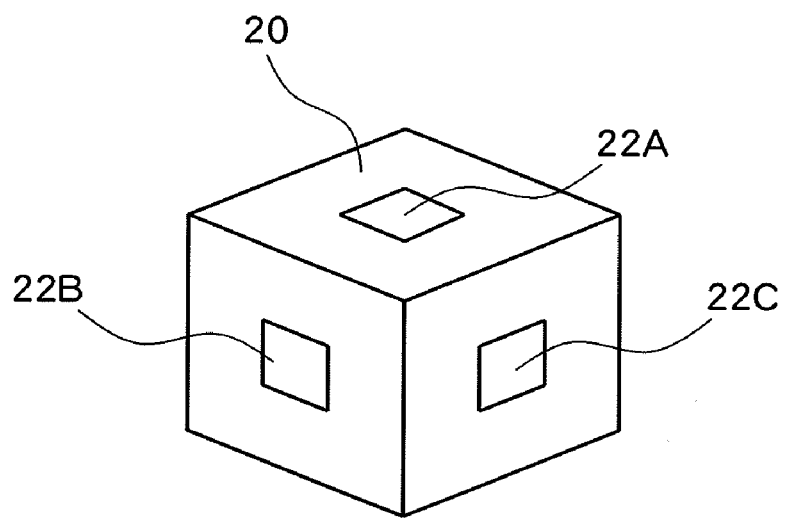
FIG. 4 is a perspective view showing the exterior of an object to be grasped used in the grasp state judging system according to the embodiment of the present invention.

FIG. 4 is an external perspective view showing the object to be grasped used in the grasp state judging system. The object to be grasped 20 shown in FIG. 4 is held by the glove 10, which is fitted onto the hand of a user. The object to be grasped 20 is formed in the shape of a cube, and RFID tags 22A to 22F (22D to 22F are not shown) are affixed to the six sides that form the surfaces of the cube. The RFID tags 22 are affixed to the surface of the object to be grasped 20, but they may also be embedded in the surface. The object to be grasped 20 is formed in the shape of a cube, but any other shape may be used. The number and positions in which the RFID tags 22 are mounted are arbitrary. Each of the RFID tags 22 transmits, to the RFID antenna 14, a pair composed of an object ID for indicating the type of object to be grasped 20 to which the RFID tags 22 are mounted, and a position ID for identifying the positions in which the RFID tag 22 is mounted. The control unit 12*a* mounted inside the control box 12 has a CPU, and the CPU and the RFID antennas 14 form a RFID reader. Power is fed from the RFID antennas 14 and the RFID tags 22 by microwaves (obtained by converting radio energy to electrical energy), electromagnetic coupling, electromagnetic induction, or the like. The RFID antennas 14 receive the pairs of the object ID and the position ID transmitted by the tags.

In the grasp state judging system, the glove 10 is fitted on a user's hand, and the object to be grasped 20 is held by the glove 10, whereupon each RFID antenna 14 receives the pair of the object ID and the position ID transmitted from the RFID tag 22 mounted on the object to be grasped 20 (within the communication area of the RFID antenna 14). FIG. 5 is a schematic diagram showing the details of data (detection data) transmitted at regular intervals from the control unit 12*a* to a computer (not shown) by a communication cable. In this data, FIG. 5(*a*) shows the data received by the RFID antennas 14, FIG. 5(*b*) shows the data detected by the vibration sensor 12*b*, and FIG. 5(*c*) shows the data detected by the pressure sensor 16. In the control unit 12*a*, the RFID antennas 14, the vibration sensor 12*b*, and the pressure sensor 16 are connected as described above, and the data received or detected by these elements is transmitted (transferred) to the computer in the format schematically shown in FIG. 5. Specifically, the pairs of the object ID and the position ID received by the RFID antennas 14 within a prejudged period of time are transmitted as the data received by the RFID antennas 14. The data detected by the pressure sensor 16 is transmitted as digital data that indicates the pressure value. The data detected by the vibration sensor 12*b* is transmitted as digital data that indicates the presence of vibrations.

Figure 6:
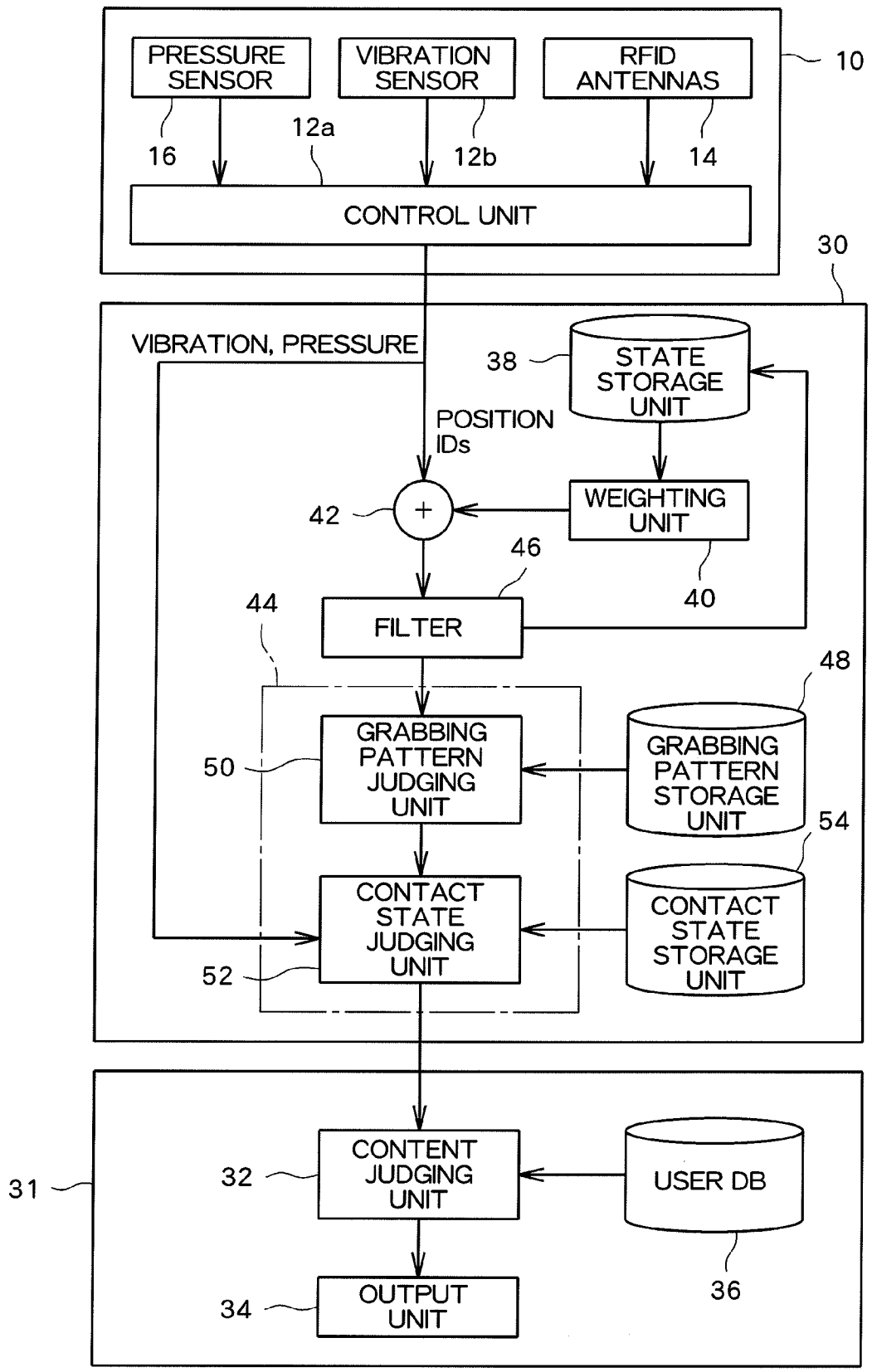
FIG. 6 is an overall structural view of the grasp state judging system according to the embodiment of the present invention.

FIG. 6 is a functional block diagram showing the entire configuration of the grasp state judging system. As shown in FIG. 6, the grasp state judging system includes the glove 10, a first computer 30, and a second computer 31. In the present embodiment, the glove 10 and the first computer 30 are connected by wire, but they may also be wirelessly connected. The first computer 30 and the second computer 31 may be connected by wired or wireless communication. These elements may also be connected via the Internet or another wide-area data communications network. Furthermore, the first computer 30 and the second computer 31 may be integrated. In other words, the first computer 30 may assume the functions of the second computer 31. In this case, the second computer 31 is not necessary.

The first computer 30 receives data periodically transmitted from the control unit 12*a*, and outputs an object ID for identifying the object to be grasped 20, a pair of a grabbing pattern ID and a grasp state ID for indicating the grasp state in which the object to be grasped 20 is held. Specifically, the first computer 30 has an adder 42, a weighting unit 40, a state storage unit 38, a filter 46, and a grasp state judging unit 44, a grabbing pattern storage unit 48, and a contact state storage unit 54. The grasp state judging unit 44 has a grabbing pattern judging unit 50 and a contact state judging unit 52. These elements are implemented by executing a prescribed program in the first computer 30. The program may be stored on a CD-ROM, DVD-ROM, or other computer-readable information storage medium and loaded on the first computer 30 from the information storage medium; or provided to the first computer 30 from the Internet or another data communications network.

Among the data transmitted to the control unit 12*a*, the pairs of the object ID and position ID received by the RFID antennas 14 are fed to the adder 42. The pairs of the object ID and position ID received by the RFID antennas 14 and previously transmitted to the grasp state judging unit 44 are stored in the state storage unit 38 (after being filtered by the filter 46). In the weighting unit 40, a prejudged weighting factor (e.g., 0.5) is supplied in correlation with the pair of the object ID and the position ID when the pair of the object ID and the position ID is supplied to the filter 46 in the previous cycle for each of the RFID antennas 14. A weighting factor having another value (e.g., 0.3) is supplied in correlation with the pair of the object ID and the position ID when the pair of the object ID and the position ID is supplied to the filter 46 two cycles prior. A weighting factor having yet another value (e.g., 0.1) is supplied in correlation with the pair of the object ID and the position ID when the pair of the object ID and the position ID is supplied to the filter 46 three cycles prior. The adder 42 adds together the weighting factors for each RFID antenna 14 and each pair of an object ID and a position ID received by the RFID antennas 14. A value of 1 is further added to the weighting factor when the data indicating that a pair of an object ID and a position ID has been transmitted by the RFID antenna 14 is transmitted from the control unit 12*a*. The above process is carried out for each RFID antenna 14 and each pair of an object ID and a position ID. Specifically, $\alpha(t)+\alpha(t-1)+\alpha(t-2)+\alpha(t-3)$ is calculated by the adder 42 for each of the RFID antennas 14 and each of the pairs of an object ID and a position ID, where $\alpha(t)$ has a value of 1 when the same pair of the object ID and position ID is included in the data currently transmitted from the control unit 12*a*, and has a value of 0 when no such pair is included. $\alpha(t-m)$ is a prejudged weighting factor that corresponds to the value of m when the same pair of the object ID and position ID is included in the data supplied m cycles prior from the filter 46 to the grasp state judging unit 44 (m=1 to 3), and that is equal to zero when no such pair is included. The results of the addition in the adder 42 are supplied to the filter 46. In the filter 46, the pair of the object ID and position ID is judged to have been reliably received by the RFID antenna 14 that has received the object ID and the position ID when the pair of the object ID and the position ID is present for which the added value is equal to or greater than a prejudged value (e.g., 1.3). On the other hand, if the added value supplied from the adder 42 is less than the aforementioned prejudged value, the object ID and position ID corresponding to the added value is judged to not have been received by the RFID antenna 14. The pair (after filtering) of the object ID and the position ID in which the judgment results are reflected and which have been received by the RFID antenna 14 is generated, and this data is supplied to the grasp state judging unit 44 and stored in the state storage unit 38.

Figure 7:
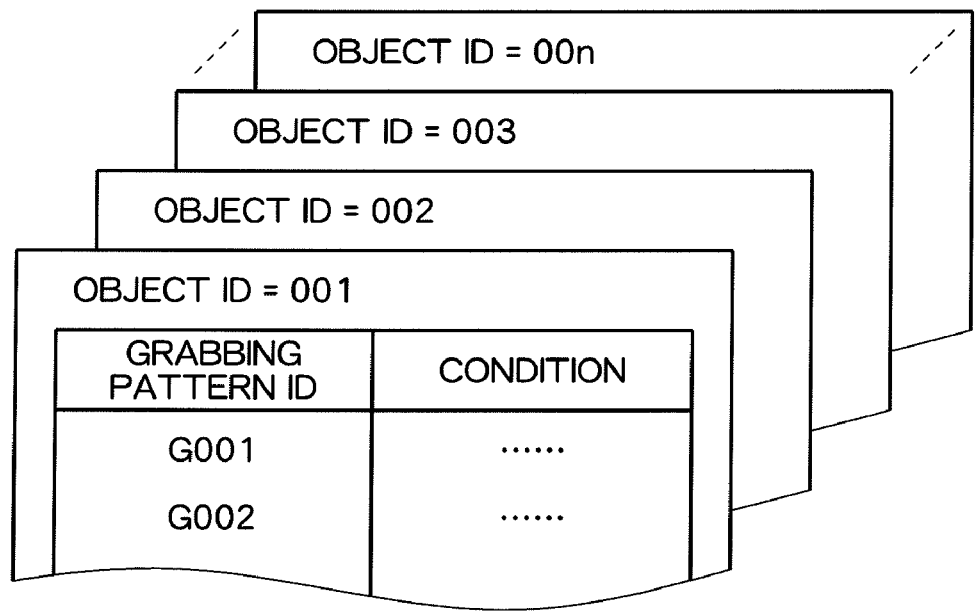
FIG. 7 is a diagram showing the content stored in a grabbing pattern storage unit.
Figure 8:
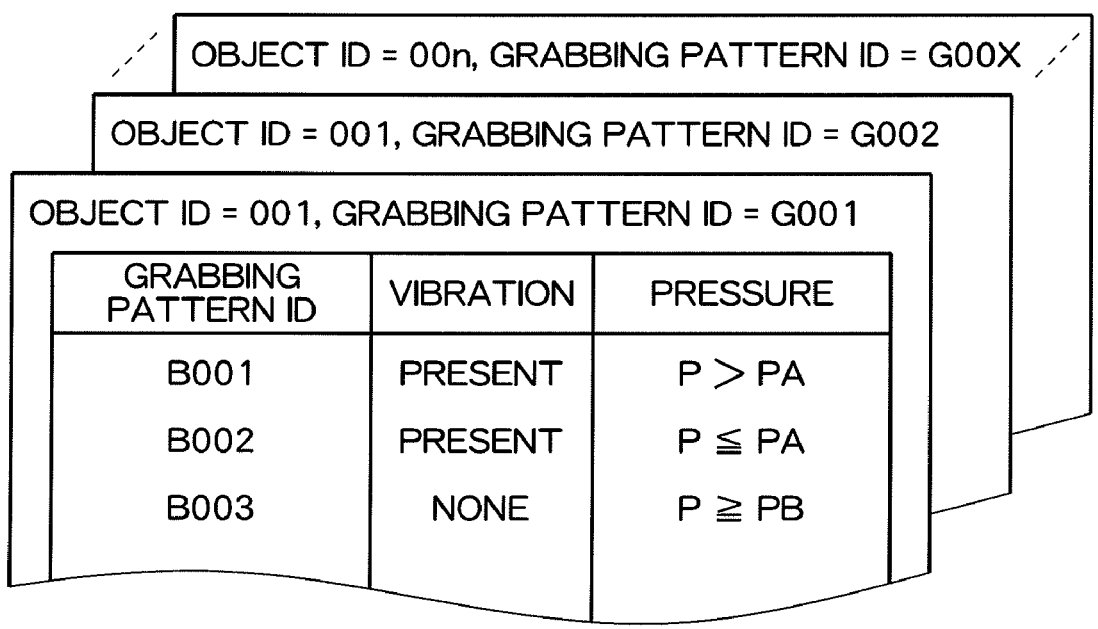
FIG. 8 is a diagram showing the content stored in a contact state storage unit.

In the grabbing pattern judging unit 50, the pair of the object ID and position ID received by each RFID antenna 14 from the filter 46 is checked against the content stored in the grabbing pattern storage unit 48. The grabbing pattern of the object 20 by the glove 10 is thereby judged, and an ID (grabbing pattern ID) indicating this pattern is supplied to the contact state judging unit 52. Specifically, for every object ID shown in FIG. 7, the grabbing pattern storage unit 48 stores data in which a correlation is established between a grabbing pattern ID and the condition to be satisfied by the output from the filter 46 in the case of a grabbing pattern identified by the grabbing pattern ID. Supplying a group of pairs of an object ID and a position ID from the filter 46 for each RFID antenna 14 causes a table that corresponds to the supplied object ID to be read from the grabbing pattern storage unit 48. The conditions stored in the table are applied to the data supplied from the filter 46, and it is judged whether the conditions are satisfied. If any of the conditions are satisfied, the grabbing pattern ID stored in correlation with the condition is supplied to the contact state judging unit 52 of a subsequent step. In the contact state judging unit 52, the content stored in the contact state storage unit 54 is used as a reference, and the state of contact of the glove 10 with the object 20 is judged based on the grabbing pattern ID supplied from the grabbing pattern judging unit 50 as well as the detection results of the vibration sensor 12*b* and the detection results of the pressure sensor 16 supplied from the control unit 12*a*. The grasp state IDs and conditions that are to be satisfied by the detection results of the vibration sensor 12*b* and the pressure sensor 16 correlated with the grasp state IDs are stored in the contact state storage unit 54 for every pair of an object ID and a position ID, as shown in FIG. 8. When a grabbing pattern ID and an object ID are first received from the grabbing pattern judging unit 50, a table corresponding to these IDs is retrieved from the contact state storage unit 54 by the contact state judging unit 52. The conditions stored in the table are then sequentially checked to see whether the conditions are satisfied by the detection results of the vibration sensor 12*b* and the detection results of the pressure sensor 16 received from the control unit 12*a*. If any of the conditions are satisfied, a contact state ID corresponding to the condition is transmitted to a content judging unit 32 along with the pair of the object ID and position ID supplied from the grabbing pattern judging unit 50.

The second computer 31 includes the content judging unit 32, a user DB 36, and an output unit 34. These elements are implemented by executing a prejudged program in the second computer 31. This program may be stored on a CD-ROM, DVD-ROM, or other computer-readable information storage medium; loaded on the second computer 31 from the information storage medium; or installed on the computer via the Internet or another data communications network.

First, contents previously presented regarding the users, the users' academic levels, and other attributes are stored in the user DB 36. In the content judging unit 32, one or a plurality of items selected in accordance with the contents stored in the user DB 36 are supplied to the output unit 34 from among the contents corresponding to the contact state ID, object ID, and grabbing pattern ID supplied from the contact state judging unit 52. In the output unit 34, the contents supplied by the content judging unit 32 is output by transmitting, displaying, printing, or another method, and the user is informed of the contents.

According to the embodiment described above, position IDs transmitted from RFID tags 22 provided to an object to be grasped 20 are received by RFID antennas 14 provided to a glove 10, and the manner in which the object to be grasped is held is judged by the pattern. The manner in which the object to be grasped is held can therefore be judged in greater detail. When the object 20 is held by the glove 10, contents corresponding to the manner in which the object to be grasped is held can be output and used in teaching materials or toys, for example.

The present invention is not limited by the above embodiment. For example, in the above description, RFID tags 22 are provided to an object to be grasped 20, and RFID antennas 14 are provided to a glove 10, but a reverse arrangement may also be adopted. The RFID antennas 14 may also be separately mounted on a user's hand by a ring-shaped mounting member, instead of providing the RFID antennas 14 to a glove 10.

The invention claimed is:

1. A grasp state judging system, comprising:
a plurality of transmitting means mounted on one of an object to be grasped and grasping means for grasping the object, each of the plurality of transmitting means transmitting position identification information;

a plurality of receiving means mounted on the other of the object to be grasped and the grasping means, each of the plurality of receiving means receiving the position identification information;

condition storage means for storing a condition for the position identification information received by the receiving means with respect to each of grasp states in which the object to be grasped is held by the grasping means; and judging means for judging the grasp state in which the object to be grasped is held by the grasping means, the judging done on the basis of the position identification information received by the plurality of receiving means and the conditions stored in the condition storage means.

2. The grasp state judging system according to claim 1, wherein the grasping means is a glove.

3. The grasp state judging system according to claim 1, further comprising:

a pressure sensor configured to detect the magnitude or presence of pressure when the object to be grasped is held by the grasping means, wherein the pressure sensor is mounted on one of the object to be grasped and the grasping means; and wherein the judging means judges the grasp state in which the object to be grasped is held by the grasping means, the judging done on the basis of the magnitude or presence of pressure detected by the pressure sensor.

4. The grasp state judging system according to claim 1, further comprising:

a vibration sensor configured to detect the magnitude or presence of vibrations when the object to be grasped is held by the grasping means is mounted on one of the object to be grasped and the grasping means, and wherein the judging means is configured to judge the grasp state in which the object to be grasped is held by the grasping means on the basis of the magnitude or presence of vibrations detected by the vibration sensor.

5. The grasp state judging system according to claim 1, wherein:

the transmitting means is RFID tag; and the receiving means is RFID antenna.

6. A grasp state judging method, comprising:

mounting, on one of an object to be grasped and grasping means for grasping the object, a plurality of transmitting means each for transmitting position identification information;

mounting, on the other of the object to be grasped and the grasping means, a plurality of receiving means each for receiving the position identification information;

storing, in condition storage means, a condition for the position identification information received by the receiving means with respect to each of grasp states in which the object to be grasped is held by the grasping means; and judging the grasp state in which the object to be grasped is held by the grasping means on the basis of the position identification information received by the plurality of receiving means and the conditions stored in the condition storage means.

* * * * *